(12) United States Patent
Vancini et al.

(10) Patent No.: US 11,810,087 B1
(45) Date of Patent: *Nov. 7, 2023

(54) SYSTEM AND METHOD FOR TRANSFERRING FUNDS

(71) Applicant: Wells Fargo Bank, N.A., San Francisco, CA (US)

(72) Inventors: Adam E. Vancini, Concord, CA (US); Imran Haider, San Ramon, CA (US); Sri Saravana Muthu, Duluth, MN (US)

(73) Assignee: Wells Fargo Bank, N.A., San Francisco, CA (US)

( * ) Notice: Subject to any disclaimer, the term of this patent is extended or adjusted under 35 U.S.C. 154(b) by 153 days.

This patent is subject to a terminal disclaimer.

(21) Appl. No.: 16/820,200

(22) Filed: Mar. 16, 2020

Related U.S. Application Data

(63) Continuation of application No. 14/868,026, filed on Sep. 28, 2015, now Pat. No. 10,592,877, which is a continuation of application No. 12/688,726, filed on Jan. 15, 2010, now Pat. No. 9,928,490.

(60) Provisional application No. 61/145,425, filed on Jan. 16, 2009.

(51) Int. Cl.
*G06Q 20/10* (2012.01)
*G06Q 40/02* (2023.01)
*G06Q 20/40* (2012.01)
*G06Q 20/02* (2012.01)
*G06Q 20/38* (2012.01)

(52) U.S. Cl.
CPC ........... *G06Q 20/108* (2013.01); *G06Q 20/02* (2013.01); *G06Q 20/10* (2013.01); *G06Q 20/3829* (2013.01); *G06Q 20/4014* (2013.01); *G06Q 40/02* (2013.01)

(58) Field of Classification Search
CPC ........ G06Q 20/10; G06Q 40/02; G06Q 20/02; G06Q 20/108; G06Q 20/3829; G06Q 20/4014
See application file for complete search history.

(56) References Cited

U.S. PATENT DOCUMENTS

| | | | |
|---|---|---|---|
| 6,317,745 B1 | 11/2001 | Thomas et al. | |
| 7,353,203 B1 | 4/2008 | Kriplani et al. | |
| 7,370,014 B1 | 5/2008 | Vasavada et al. | |

(Continued)

OTHER PUBLICATIONS

Marlin, Steven, "E-Trade Eases Funds Transfer," InformationWeek, Apr. 26, 2004, 986; ProQuest, page 53.

*Primary Examiner* — Eric T Wong
(74) *Attorney, Agent, or Firm* — Foley & Lardner LLP

(57) ABSTRACT

Systems, methods for payment processing performed by one or more processors of a payment service computer system. One method includes receiving a fund transfer request from a recipient identifying a sender and a fund transfer amount. The method further includes identifying a financial institution associated with the sender. The method further includes determining the financial institution is not associated with the payment system. The method further includes selecting an authentication process for the recipient based on a level of risk. The method further includes performing the authentication process based on the level of risk, the authentication process including prompting the sender to provide information regarding the sender. The method further includes verifying accuracy of the information regarding the sender by scraping the information maintained by the financial institution using the access credentials and sending the fund transfer amount to the recipient.

17 Claims, 11 Drawing Sheets

(56) References Cited

U.S. PATENT DOCUMENTS

| | | | | |
|---|---|---|---|---|
| 7,644,037 | B1* | 1/2010 | Ostrovsky | G06Q 30/06 |
| | | | | 705/40 |
| 8,249,983 | B2* | 8/2012 | Dilip et al. | G06Q 40/02 |
| | | | | 705/42 |
| 2003/0126134 | A1 | 7/2003 | Messing et al. | |
| 2004/0059672 | A1 | 3/2004 | Baig et al. | |
| 2004/0143552 | A1* | 7/2004 | Weichert et al. | G06Q 40/04 |
| | | | | 705/64 |
| 2005/0097320 | A1* | 5/2005 | Golan et al. | G06F 21/40 |
| | | | | 713/166 |
| 2007/0022375 | A1 | 1/2007 | Walker | |
| 2007/0179885 | A1* | 8/2007 | Bird et al. | G06Q 20/10 |
| | | | | 705/39 |
| 2007/0255653 | A1 | 11/2007 | Tumminaro et al. | |
| 2009/0119212 | A1 | 5/2009 | Liu et al. | |
| 2009/0281946 | A1 | 11/2009 | Davis et al. | |
| 2010/0042538 | A1* | 2/2010 | Dheer et al. | G06Q 20/223 |
| | | | | 705/40 |

\* cited by examiner

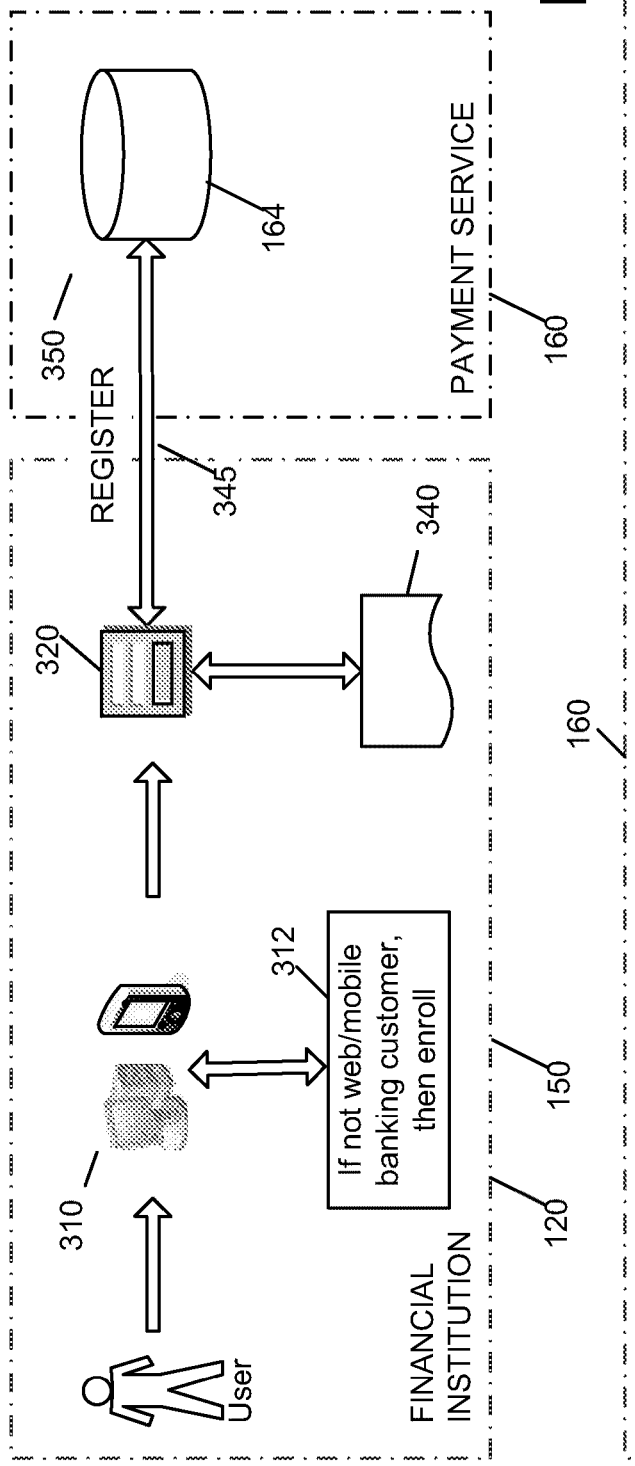
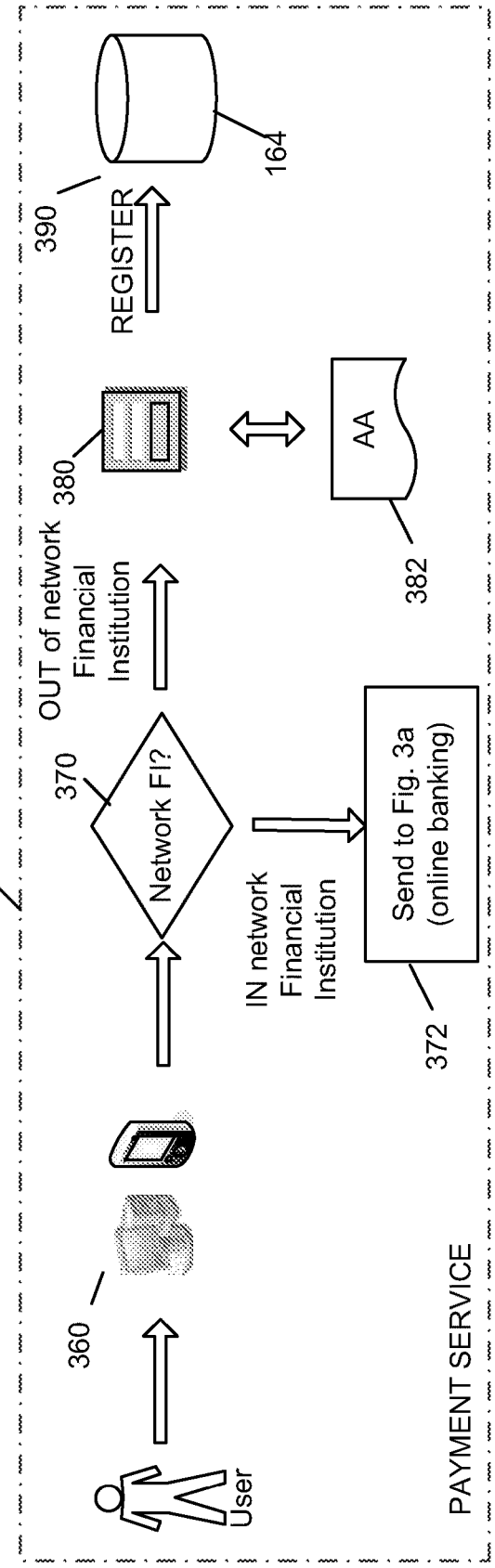

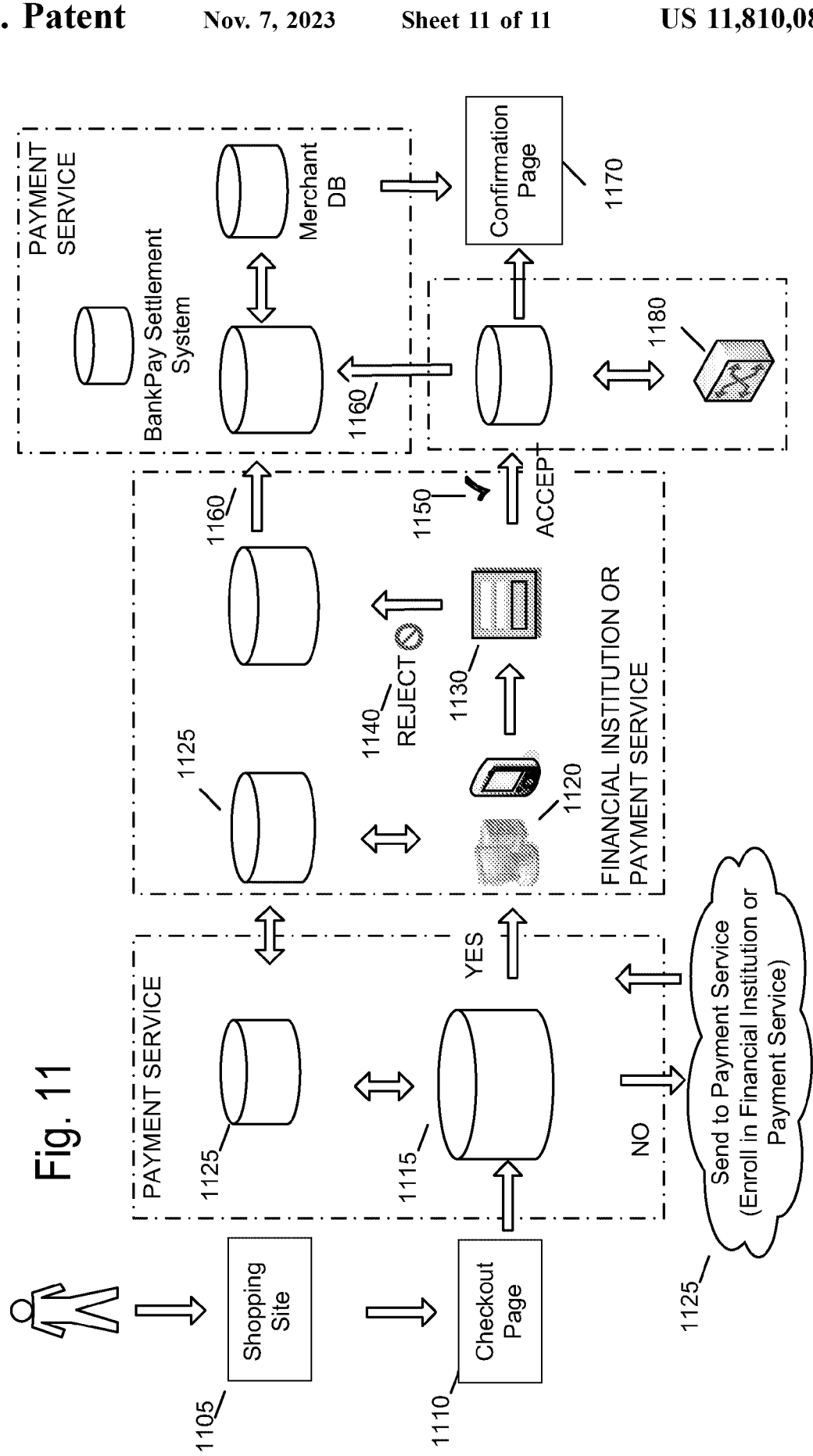

SYSTEM AND METHOD FOR TRANSFERRING FUNDS

CROSS REFERENCE TO RELATED APPLICATIONS

This application is a continuation of U.S. Application No. 14/868,026 filed Sep. 28, 2015, which claims priority to and is a continuation of U.S. Application No. 12/688,726 filed Jan. 15, 2010, which claims the benefit of priority to U.S. Provisional Application No. 61/145,425 filed Jan. 16, 2009, all of which are incorporated herein by reference in their entireties.

BACKGROUND

Embodiments of the present invention relate generally to the field of transferring funds. In particular, they relate to systems and methods for transferring funds using computer systems.

Payments made between individuals are often made with cash or checks. Payments for items and services purchased from businesses are often also made with cash or checks, and are also often made using credit cards or debit cards. While these payment mechanisms have worked well, enhanced systems and methods of facilitating such payments would be desirable.

SUMMARY

A fund transfer method and system comprises receiving sender information, receiving a fund transfer request that includes an identifier for a recipient, accessing an information directory based on the identifier to obtain account information for the recipient, and sending funds to the recipient according to the fund transfer request. The identifier may be in the form of non-sensitive/publicly available information, such as an E-mail address, a phone number, or other information. The information directory can correlate the identifier with a recipient owned bank account. The fund transfer may occur between two accounts within a bank or between bank accounts at different banks.

A payment processing method comprises receiving a fund transfer request from a sender, the sender having a first account at a first financial institution, the fund transfer request including an identifier for a recipient, the recipient having a second account at a second financial institution, the first financial institution having a first financial institution computer system and the second financial institution having a second financial institution computer system. The method includes accessing an account information directory system based on the identifier, the account information directory system comprising a first account information directory implemented by the first financial institution computer system and a second account information directory implemented by the second financial institution computer system. The method includes sending funds to the recipient according to the fund transfer request using account information obtained from the account information directory system.

BRIEF DESCRIPTION OF THE DRAWINGS

FIGS. 3a and 3b are processes in which a user registers with a payment service according to example embodiments.

FIG. 11 is a process in which a user makes a payment to an online merchant using a payment service according to an example embodiment.

DETAILED DESCRIPTION OF THE EXAMPLE EMBODIMENTS

Figure 1:
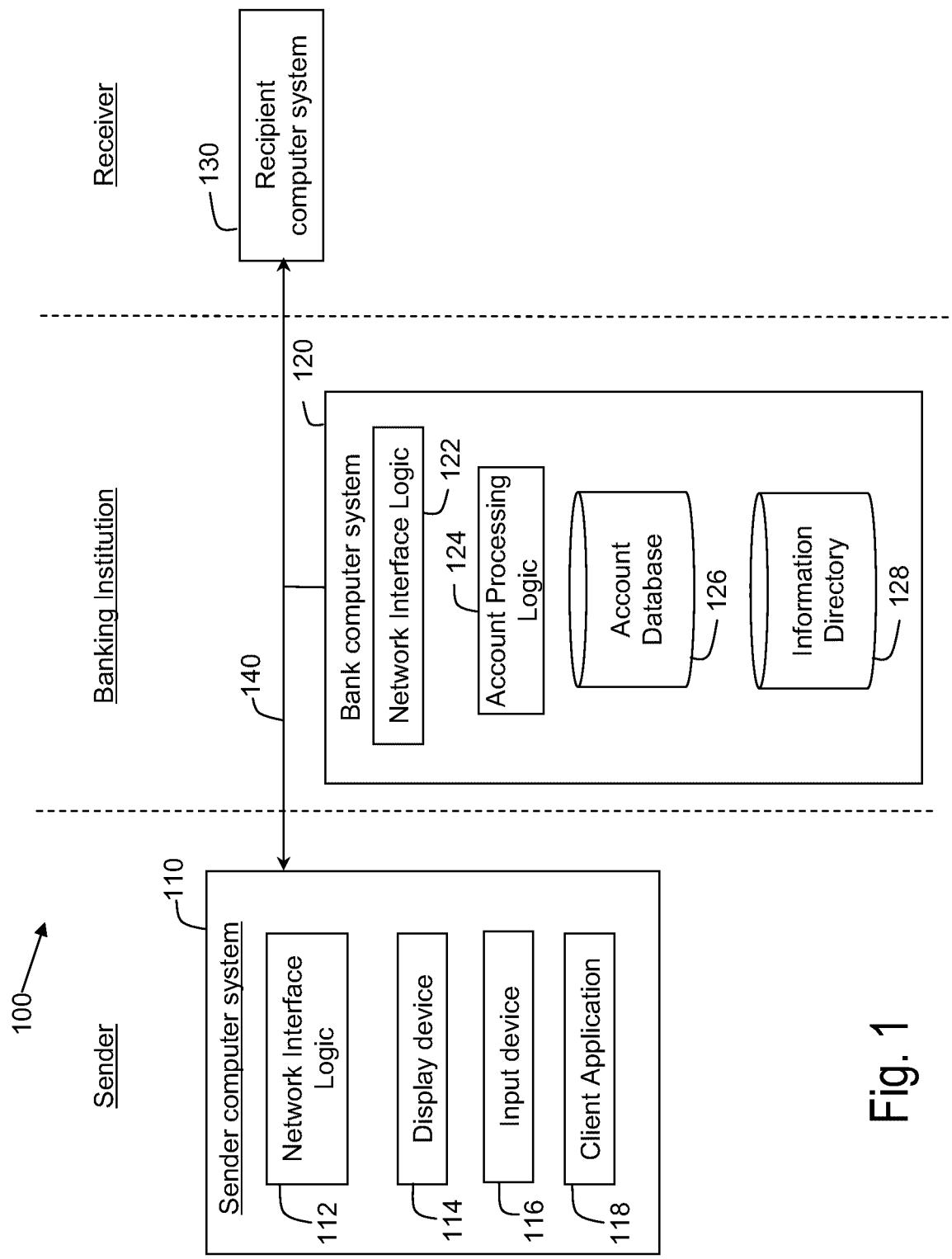
FIG. 1 is a schematic diagram of a fund transfer system in which a sender and a recipient use the same banking institution according to an example embodiment.
Figure 2:
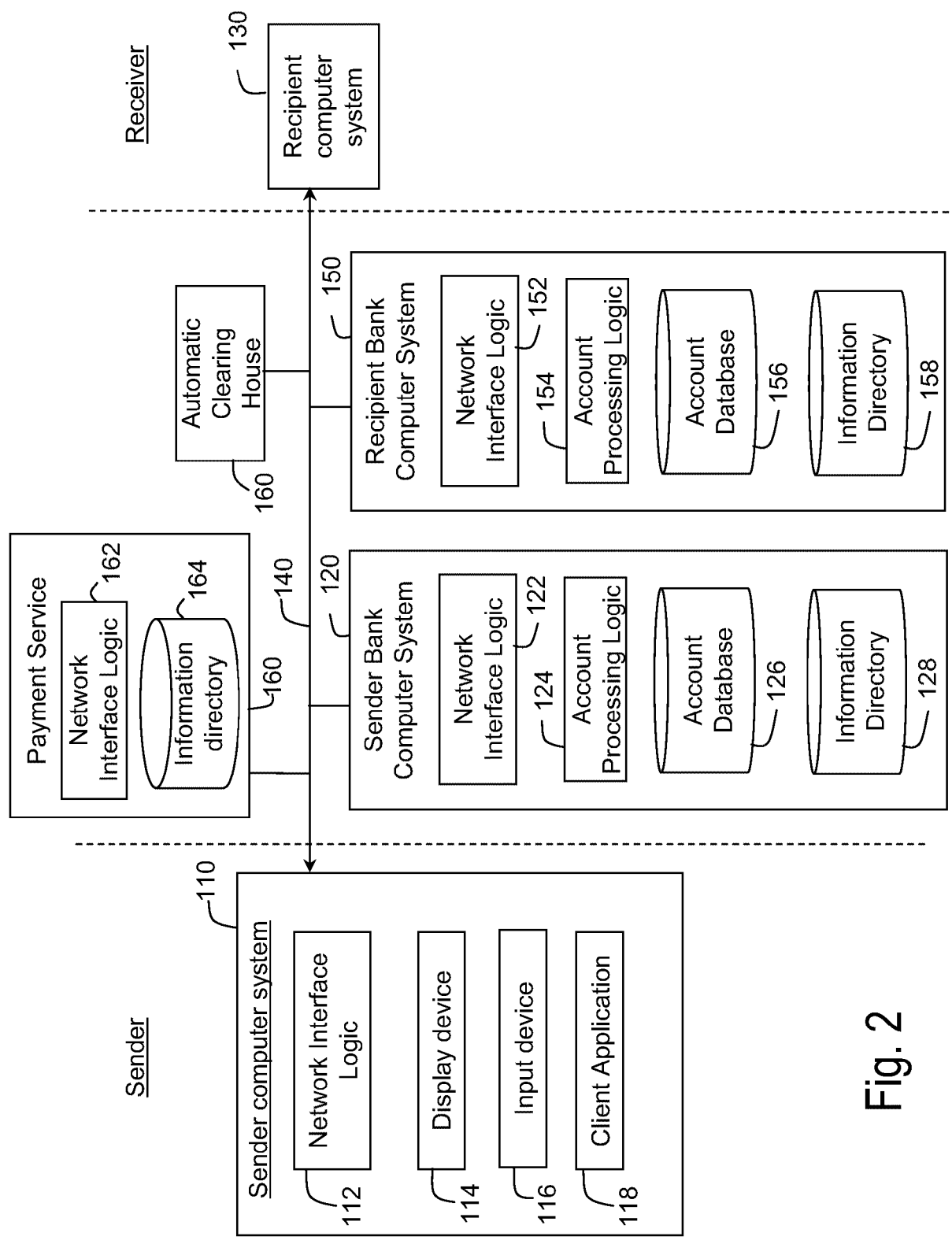
FIG. 2 is a schematic diagram of a fund transfer system in which a sender and a recipient use different banking institutions according to another example embodiment.

Referring to FIGS. 1-2, a fund transfer system 100 is shown. The fund transfer system 100 may be utilized by senders to send funds to recipients and by recipients to receive the funds. The senders and recipients may be individuals or business entities. In the example embodiment, the sender uses a bank account as the source of funds. In other embodiments, the sender may use credit cards, debit cards, business credit cards or check cards as the source of funds.

The fund transfer system 100 may be used for both intrabank transfers (i.e., transfers in which the sender and the recipient both have accounts at the same bank and the funds are transferred between the accounts within the same bank) and interbank transfers (i.e., transfers in which the sender and the recipient have accounts at different banks and the funds are transferred between the accounts at different banks). FIG. 1 shows an arrangement that may be used for intrabank transfers. FIG. 2 shows an arrangement that may be used for both intrabank transfers and interbank transfers.

With reference first to FIG. 1, the fund transfer system 100 may include, among other systems, a sender computer system 110, a bank computer system 120, and a recipient computer system 130. Each of the above described systems may communicate through a network 140, which may include one or more of the Internet, Cellular network, Wi-Fi, Wi-Max, a proprietary banking network, and so on.

The sender computer system 110 may be used by an individual user (e.g., a business owner or employee, a consumer, and so on) to create transactions and interact with banking functions provided through an online banking area of a website provided by the bank computer system 120 or through a website provided by a payment service 160 (shown in FIG. 2). The sender computer system 110 may, for example, comprise a user computer (e.g., desktop or laptop computer), a cellular telephone, smart phone, a mobile handheld wireless e-mail device, a personal digital assistant, a portable gaming device, or other suitable device. The sender computer system 110 may also comprise one or more servers each with one or more processors configured to execute instructions stored in memory. For example, such an arrangement may be utilized if the sender is a merchant or other business.

The sender computer system 110 may comprise network interface logic 112, a display device 114, an input device 116, and client application 118. Network interface logic 112 may include, for example, program logic that connects the sender computer system 110 to the network 140. As described in greater detail below, for example, the sender computer system 110 may receive and display screens on the display device 114 including account information, transaction instructions, and so on. In an example embodiment, such screens may be used to request a username and password information. Such screens may also be used to prompt the user to provide information regarding the amount of the funds and the identity of the merchant or individual that is to receive the funds. Such information may comprise, for example, a name, an address, a phone number, an e-mail address, a proxy or token, a selection of a recipient from an electronic directory, and/or other information. Such screens may also include screens displaying information regarding past transactions. Such screens are presented to the user via the display device 114. The input device 116 may be used to permit the user to initiate account access and to facilitate receiving fund transfer request information from the user.

The client application 118 may comprise program logic (i.e., stored executable instructions) configured to implement at least some of the functions described herein. As will be appreciated, the level of functionality that resides on the sender computer system 110 other components of the fund transfer system 100 may vary depending on the implementation. The client application 118 may simply be a web browser (e.g., Internet Explorer®, Mozilla Firefox®, Chrome®, Safari®, and so on) configured to receive and display web pages received from the banking computer system 120. The client application may also comprise a mobile web browser, text message (SMS) interface, a dedicated application, or other program suitable for sending and receiving information over the network 140.

The bank computer system 120 is operated by a bank institution that maintains accounts held by customers, such as demand deposit accounts, credit card accounts, home mortgage loans, student loans, and so on. The bank computer system 120 may, for example, comprise one or more servers each with one or more processors configured to execute instructions stored in memory, send and receive data stored in memory, and perform other operations to implement the operations described herein associated with logic or processes shown in FIGS. 1-11. The bank computer system 120 may include network interface logic 122, account processing logic 124, an account database 126, and an information directory 128. The network interface logic 122 may include, for example, program logic that connects the bank computer system 120 to the network 140. The network interface logic 122 may facilitate secure communications between the bank and the sender and/or the recipient. The network interface logic 122 may also facilitate communication with other entities, such as other banks, settlement systems, and so on. The network interface logic 122 may include user interface program logic configured to generate and present web pages to users accessing the bank computer system 120 over the network 140.

The account processing logic 124 performs account processing to process transactions in connection with the account(s) of the account holder, such as account credits and debits to checking and savings accounts, credits and debits to home mortgage and home equity accounts, credits and debits to student loan accounts, and so on. Thus, whenever funds are transferred into or out of an account of an account holder (e.g., a sender or recipient of funds), the account processing logic 124 reflects an appropriate debit or credit in the account database 126, which stores account information (e.g., transactions, information about the account holder, and so on) for accounts that are maintained by the bank on behalf of its customers. The account processing logic 124 may also process fund transfer requests to transfer funds from a sender using the sender computer system 110 to a recipient using the recipient computer system 130.

The information directory 128 may be used when an identifier other than a bank account/routing number is used (e.g. an e-mail address, phone number, Universal Payment Identification Code (UPIC), other randomly generated number, proxy or token). The information directory 128 is a database that is maintained to allow the financial institution to convert/correlate the recipient's cell phone number (or e-mail address, or proxy or token) to a bank account number/routing number of the recipient's bank account. This arrangement allows the sender to uniquely identify the recipient (e.g., with an e-mail address or other identifier), without necessarily having private/personal information regarding the recipient (i.e., the recipient's bank account/routing number). Users including senders and recipients may register their information with the information directory 128 in advance.

The recipient computer system 130 may be configured in generally the same manner as the other computer systems described herein. For example, if the fund recipient is an individual, the computer system 130 may be a mobile device, such as a cellular phone, smart phone, mobile handheld wireless e-mail device, personal digital assistant, portable gaming devices, a desktop computer or other suitable device. The computer system 130 may also comprise one or more servers each with one or more processors configured to execute instructions stored in memory. For example, such an arrangement may be utilized if the recipient is a merchant or other business.

Referring now also to FIG. 2, FIG. 2 is similar to FIG. 1 except that additional components are shown. As previously indicated, FIG. 2 shows an arrangement that may be used for both intrabank transfers and interbank transfers. Similar to FIG. 1, FIG. 2 has a sender computer system 110, a sender bank computer system 120, and a recipient computer system 130. In addition, in FIG. 2, recipient bank computer system 150, a payment service computer system 160, and an automated clearing house computer system 170 are shown.

The recipient bank computer system 150 may be configured in a similar manner as the bank computer system 120. Thus, the bank computer system 150 comprises network interface logic 152, account processing logic 154, account database 156, and information directory 158 corresponding to the network interface logic 122, account processing logic 124, account database 126 and information directory 128 of the bank computer system 120. In FIG. 2 and throughout the remaining description, for sake of providing an example, it is assumed that the sender performs a funds transfer from an account maintained by the bank computer system 120 and the receiver receives the funds using an account maintained by the bank computer system 150. Hence, the computer system 120 is sometimes referred to herein as the sender bank computer system and the computer system 150 is sometimes referred to herein as the receiver bank computer system. It will be appreciated of course that any given bank computer system may operate in different capacities in the context of different fund transfer transactions.

The payment service computer system 160 may be associated with a payment service that is configured to facilitate interbank fund transfers. The payment service may, for example, be an entity that is formed as a joint venture between banks that send and receive funds using the fund transfer system 100. As another example, the payment service may be a third-party vendor. As another example, the payment service may be a web portal provided for an online community of individuals where such individuals obtain user names/login IDs or otherwise become registered members. The individuals may, for example, use the web portal to interact with each other and/or to interact with a service provided by the online community. Examples of online communities include MSN®, iPhone® users, Facebook®, LinkedIn®, and so on. The payment service may, for example, be an additional service that is offered by the web portal to the members of the online community. As another example, the payment service may be provided by one of the banks, i.e., such that the bank performs both the operations described herein as being performed by the bank computer system 120/150 and the operations described herein as being performed by the payment service computer system 160.

Herein, the banks associated with computer systems 120 and 150 are assumed to be "member banks." That is, the banks associated with computer systems 120 and 150 are assumed to follow established protocols for transferring funds using the fund transfer system 100. (An example of such protocols is described below in connection with FIGS. 3-11.) For example, in the context of a payment service that is created as a joint venture, the member banks may include at least the banks that are part owners of the joint venture, as well as potentially other banks. The payment service may also be used by senders and recipients that have bank accounts at non-member banks, for example, by permitting such users to register directly with the payment service. Such an arrangement is described in greater detail below in connection with FIGS. 3-11.

The payment service computer system 160 may, for example, comprise one or more servers each with one or more processors configured to execute instructions stored in memory, send and receive data stored in memory, and perform other operations to implement the operations described herein associated with logic or processes shown in FIGS. 2-11. The payment service computer system 160 includes network interface logic 162 and an information directory 164. The network interface logic 162 may include user interface program logic configured to generate and present web pages to users accessing the payment service computer system 160 over the network 140. The information directory 164 may be used when an identifier other than a bank account/routing number is used (e.g. an e-mail address, phone number, Universal Payment Identification Code (UPIC), other randomly generated number, proxy or token). As described above in connection with the information directory 128 and 158, the information directory 164 is a database that is maintained to allow the payment service to convert/correlate the recipient's cell phone number (or e-mail address, or proxy or token) to a bank account number/routing number of the recipient's bank account. This arrangement allows the sender to uniquely identify the recipient (e.g., with an e-mail address or other identifier), without necessarily having private/personal information regarding the recipient (i.e., the recipient's bank account/routing number). Users including senders and recipients may register their information with the information directory 164 in advance.

As will be appreciated, the information that is stored in the information directory 164 may vary depending on the implementation, including the extent to which information is also stored in the information directories 128 and 158. For example, for a user that has an account with a member bank, the information that is stored in the information directory 164 may include information sufficient for the member bank to identify the user, but not necessarily the bank account number/routing number, or other sensitive information such as the social security number of the user. In the context of a given transaction, such information may be passed along by the payment service computer system 160 to the bank computer system 120 or 150, and the bank computer system 120 or 150 may access its own information directory 128 or 158 to obtain more detailed account information. In another embodiment, instead of using a payment service computer system 160 to maintain the information directory 164, such information may be stored entirely in the information directories 128, 158 maintained by individual member banks. As will also be appreciated, the extent to which transaction details are tracked and maintained in the account processing logic 124, 154 as compared to the extent to which transaction details are tracked and maintained by the payment service computer system 160 may vary depending on the implementation.

The Automatic Clearing House (ACH) system 170 is used to transmit funds to and from bank accounts of the senders and recipients. As is known, the ACH Network is a nationwide batch-oriented electronic funds transfer system which provides for interbank clearing of electronic payments for participating depository financial institutions. An ACH entry may start with an account holder (known as the Receiver in ACH terminology) authorizing an Originator (e.g., a person or a company) to issue ACH debit or credit to an account. Depending on the ACH transaction, the Originator must receive authorization from the Receiver. In accordance with the rules and regulations of ACH, no financial institution may issue an ACH transaction (whether it is debit or credit) towards an account without prior authorization from the Receiver. Once authorization is received, the Originator then creates an ACH entry to be given to an Originating Depository Financial Institution (ODFI), which may be any financial institution that does ACH origination. This ACH entry is then sent to an ACH Operator (i.e., central clearing facilities through which financial institutions transmit or receive ACH entries, e.g., the Federal Reserve or the Electronic Payments Network) and is passed on to the Receiving Depository Financial Institution (RDFI), where the Receiver's account is issued either a credit or debit, depending on the ACH transaction. The RDFI may, however, reject the ACH transaction and return it to the ODFI with the appropriate reason, such as that there were insufficient funds in the account or that the account holder indicated that the transaction was unauthorized. An RDFI has a prescribed amount of time in which to perform returns (e.g., two to sixty days from the receipt of the ACH transaction). An ODFI receiving a return of an ACH entry may re-present the ACH entry two more times, or up to three total times, for settlement. Again, the RDFI may reject the transaction, after which the ODFI may no longer represent the transaction via ACH. The above description of ACH system is one in use currently, the embodiments of the current invention will continue to function similarly even if some methods and steps in the ACH system are modified.

Referring now to FIGS. 3-11, FIGS. 3-11 show various example process that may be implemented by the system 100. FIG. 3a is a process in which a user that has an account at a member bank registers to use the payment service. At step 310, the user accesses an online banking area of a website of the bank. For sake of an example, it is assumed herein that the user accesses the bank computer system 120. The bank computer system 120 may be accessed using client application 118 which, as indicated above, may be a web browser, a dedicated application, etc. At step 312, the bank computer system 120 determines whether the user has previously registered as an online/mobile banking customer. If the user has previously registered, then the bank computer system 120 has already issued a login ID to the user which is associated with particular accounts held by the user at the bank. If the user has not previously registered, then the user is prompted to enroll in online banking. In either case, next, at step 320, the user registers for the payment service. At step 320, the user is prompted to provide instructions regarding the preferences of the user regarding the payment service (i.e., account options and so on). The user may also be prompted to provide an identifier that may be used by others to identify the user for purposes of sending or receiving payments. For example, the user may provide an e-mail address, cell phone number, or other identifier which the user may provide to others as a substitute for other more sensitive information (i.e., as a substitute for the user's bank account/routing number), as previously indicated. After the information is collected, at step 340, the bank computer system 120 may verify eligibility for the payment service, set transaction limits, and so on. At step 345, the collected information may be transmitted by the bank computer system 120 to the payment service computer system 160 via the network 140. At step 350, the payment service computer system 160 stores the collected information financial information in information directory 164. The information directory 164 maintains correlating information relating to the bank identification, the user identification, E-mail address, mobile phone number, WPIC, other user generated or random generated tokens and a risk score (discussed in greater detail with regard to FIG. 4).

FIG. 3b is a process in which a user registers to use the payment service through a website provided by the payment service computer system 160. At step 360, the user accesses the website of the payment service. At step 370, the payment service computer system 160 prompts the user to provide the name of the banking institution where the user has an account. If the banking institution identified by the user is a member bank, then at step 372 the user is redirected to the website of the bank and the process moves forward in accordance with FIG. 3a. If, however, the bank is not a member bank, then at step 380 information is collected from the user sufficient to establish an account with the payment service (e.g., bank account/routing number information, an identifier that may be provided to other users, and so on). Upon receiving such information, the payment service computer system 160 may perform other operations at step 382, such as verifying the identity of the user, verifying the account information, verifying the availability of the funds in the bank account, assessing financial risk posed by the user, setting transaction limits, and/or other operations. At step 390, the collected information may then be stored in information directory 164. In another alternative embodiment, when a user registers through the payment service computer system 160, the user may only receive incoming funds into their bank account and must register with a bank in order to initiate fund transfer requests.

Figure 4:
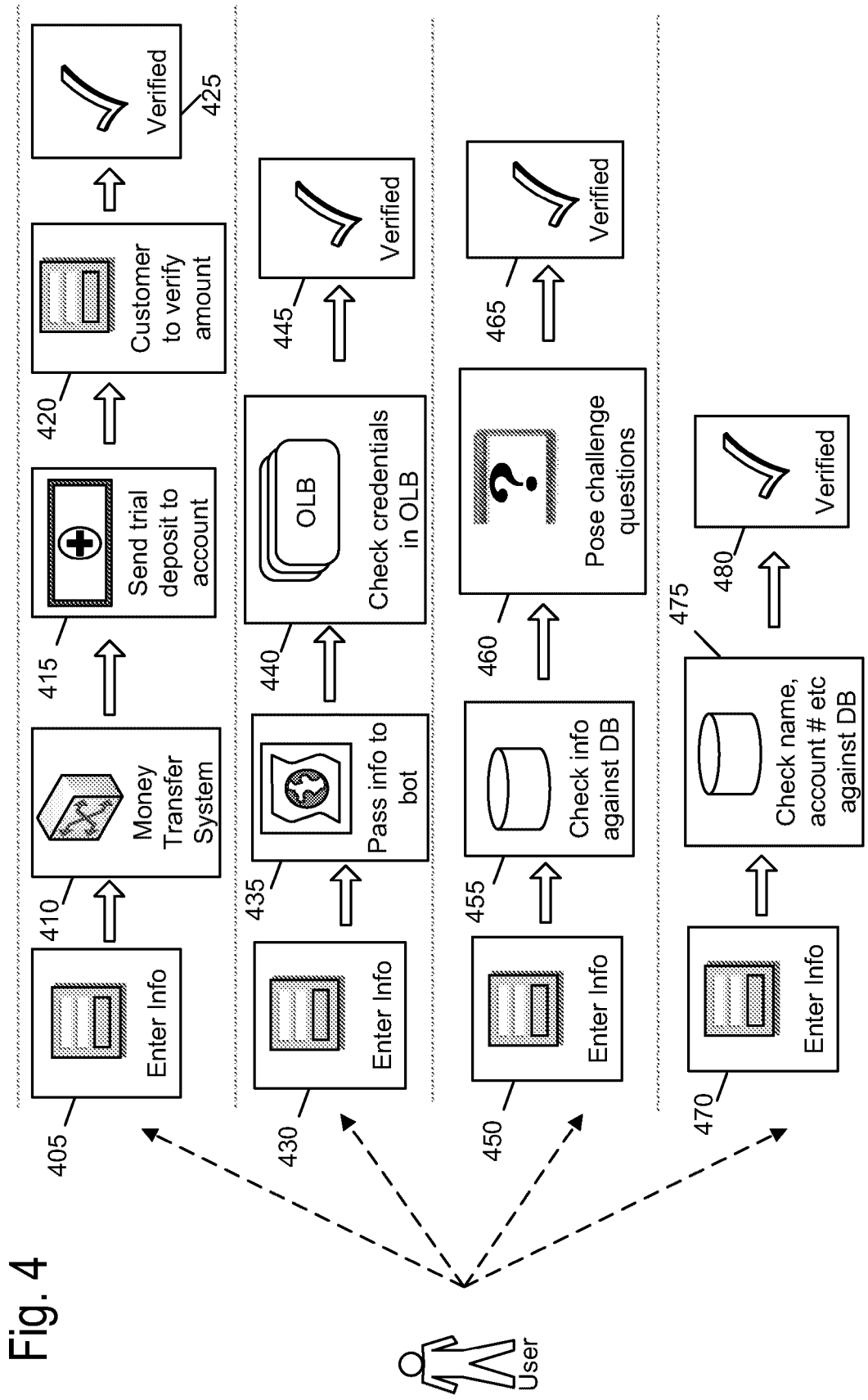
FIG. 4 is a process in which the identity of a user is verified based on the level of risk according to an example embodiment.

FIG. 4 shows processes that may be used to verify user information based on the level of risk. FIG. 4 shows four different process for authenticating a user depending on a level of risk. The processes shown in FIG. 4 may be implemented at the time the user first registers with the payment service, at the time when a funds transfer is to be performed, and/or a combination of both. A combination of any one of the methods may be used based on a determination of the level of risk associated with the user and/or the transaction. For example, funds transfers that involve large dollar amounts may result in more extensive authentication than fund transfers involving small dollar amounts.

According to a first process, a trial deposit is sent to an account of the user, and the user verifies the amount deposited. For example, when funds are being transferred to a previously-unregistered user, it may be desirable to perform a trial deposit to ensure that the user's account information has been accurately collected. Thus, at step 405, account information is collected from the user. At step 410, funds are sent to a money transfer system (e.g., ACH system 170) and, at step 415, the money transfer system deposits the funds in the account identified by the user. For example, the ACH system 170 may be used to send a trial deposit of a nominal amount (e.g., a few cents, less than one dollar, etc.) into the account identified by the user. Since the user should have access to transaction information for their own bank account, the user 400 should be able to verify the amount of the deposit into the account. At step 420, the user is prompted to identify the amount of funds deposited into the account. If the amount identified by the user matches the trial deposit 415, then the user 400 is considered to be verified. In other embodiments, the trial deposit method described above may be repeated up to three times to account for guessing the correct amount.

According to a second process, a web scraping arrangement is used to verify the account information. Again, at step 430, account information is collected from the user. At step 435, the information provided by the user is passed to an automation bot. At step 440, the automation bot scrapes the website of the bank identified by the user, e.g., by passing the information provided by the user to an online banking area of a website of the bank, and determining whether such information appears to constitute valid credentials based on the response of the website.

According to a third process, a challenge question is used to verify the account information. Again, at step 450, account information is collected from the user. At step 455, the account information provided by the user is checked against information previously stored concerning the user. Such information may include challenge questions that the user has previously answered (e.g., mother's maiden name, and so on). At step 460, such challenge questions may be posed to the user. The identity of the user is then verified at step 465 based on the user providing the correct answer to the challenge question.

According to a fourth process, other fraud databases are used to verify the account information. Again, at step 470, account information is collected from the user. Next, at step 475, the name, account number, etc. is checked against the three major rating agencies such as Equifax®, Experian® or TransUnion® to verify the information entered by the user 400. Each of the above verification methods may be used in combination, such as but not limited to using a challenge question and the trial deposit method in combination.

Figure 5:
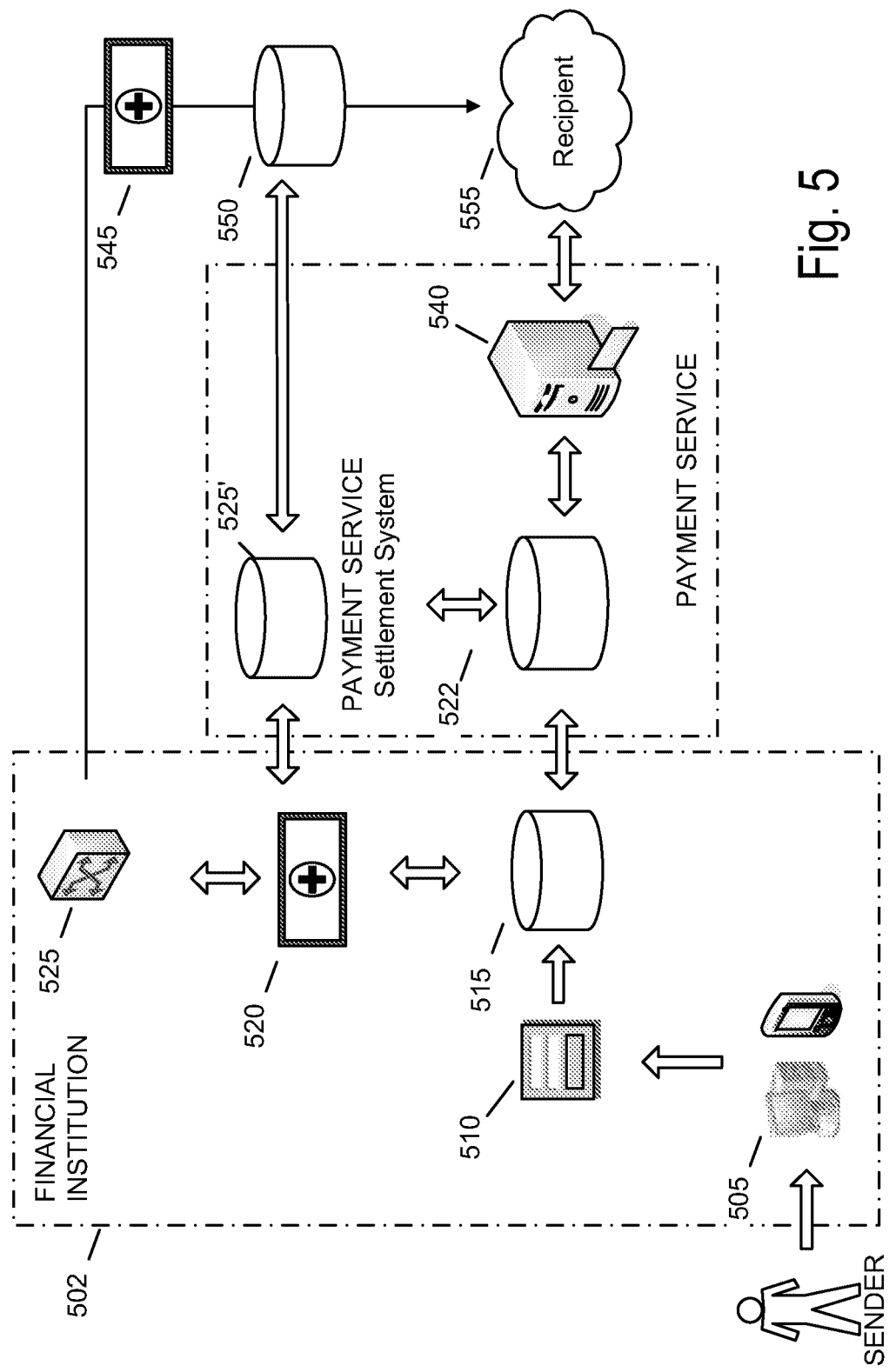
FIG. 5 is a process in which a registered user sends a payment using an online banking area of a bank website according to an example embodiment.

FIG. 5 is process in which a sender that has previously registered with the payment service sends funds to a recipient. In the example of FIG. 5, the sender is assumed to have registered through a bank using the process of FIG. 3a. In FIG. 5, the sender accesses the payment service through an online banking area of the website of the sender's bank. At step 505, the sender logs into an online banking area of the website provided by the bank computer system 120, e.g., using a browser, an application, a text message (SMS), etc. Next, at step 510, information identifying the recipient of the payment is collected from the sender. The recipient identifying information may be an email address, mobile phone number, or other identifier. As another example, the sender may be provided with a view into the information directory 164, such that the sender can select the recipient from a list of registered users. Also collected at step 510 is information regarding the fund transfer amount, date to send, funding account, remittance info, and so on. A two party verification key may also be received from the user at step 510, e.g., if a bilateral relationship is not already established. For example, the sender may formulate a challenge question based on information that is known to both parties. Subsequently, the recipient must answer the challenge question in order to retrieve their payment. As another example, the sender may formulate a verification key such as password, provide the verification key at step 510, and inform the recipient of the verification key through a separate telephone call or message.

At step 515, the bank computer system 120 accesses the account profile of the sender. At step 522, an account profile of the recipient may be accessed in the information directory 164 maintained by the payment service computer system 160. The information directory 164 may be queried to obtain information for routing the funds to the recipient, for example, a routing number of a central settlement account associated with the recipient's bank.

At step 520, the requested funds are moved from the sender's account to an Originating Depository Financial Institution (ODFI) settlement account of the sender's bank. At step 525, the funds are transferred via the ACH system 170 to a settlement account associated with the recipient's bank. In another embodiment, the payment service computer system 160 is used as the clearing house for the transferred funds. In such an embodiment, at step 525', the funds are transferred via a settlement system of the payment service computer system 160 to the recipient's bank. At step 540, after the funds are moved to the recipient's bank, the payment service computer system 160 is informed that the funds have been moved and a notice is sent to the recipient. The notice to the recipient may be in the form of an e-mail, a SMS, an automated voice message, and so on. After receiving the notice, the recipient may retrieve the funds. This process is described in greater detail below in connection with FIGS. 7-8.

Figure 6:
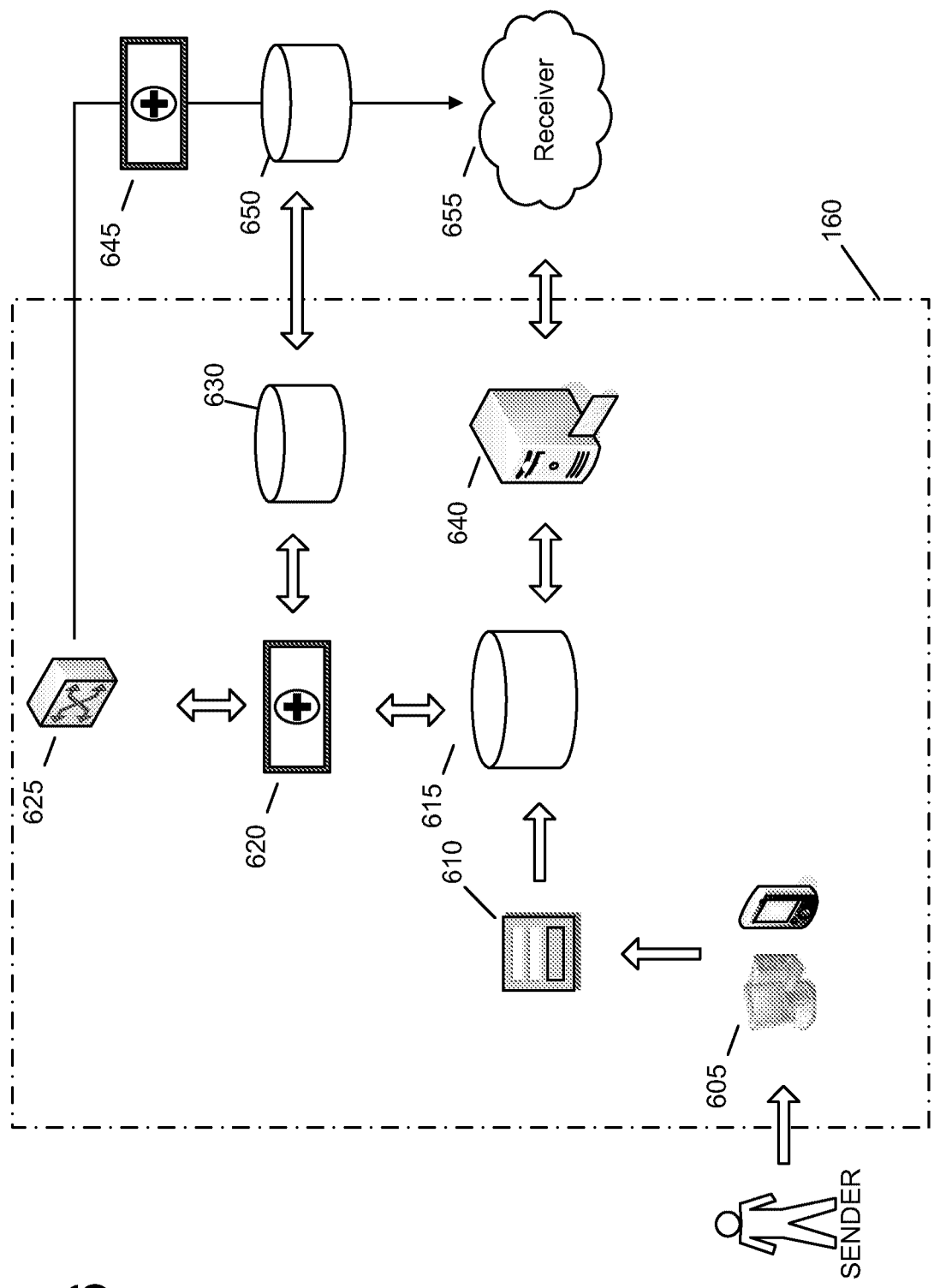
FIG. 6 is a process in which a registered user sends a payment using a website of a payment service according to an example embodiment.

FIG. 6 is process in which a sender that has previously registered with the payment service sends funds to a recipient. In the example of FIG. 6, the sender is assumed to have registered through the payment service computer system 160 using the process of FIG. 3b. In FIG. 6, the sender accesses the payment service through a website provided by the payment service computer system 160. The steps 605-665 of FIG. 6 are generally similar to steps 505-565 of FIG. 5, except that steps 605-620 and 625 are performed by the payment service computer system 160 instead of by the sender's bank, which is assumed to be a non-member bank. In this embodiment, there may be a 2-3 day settlement period to permit the funds to be successfully retrieved from the sender's bank before distributing the funds to the recipient.

Figure 7:
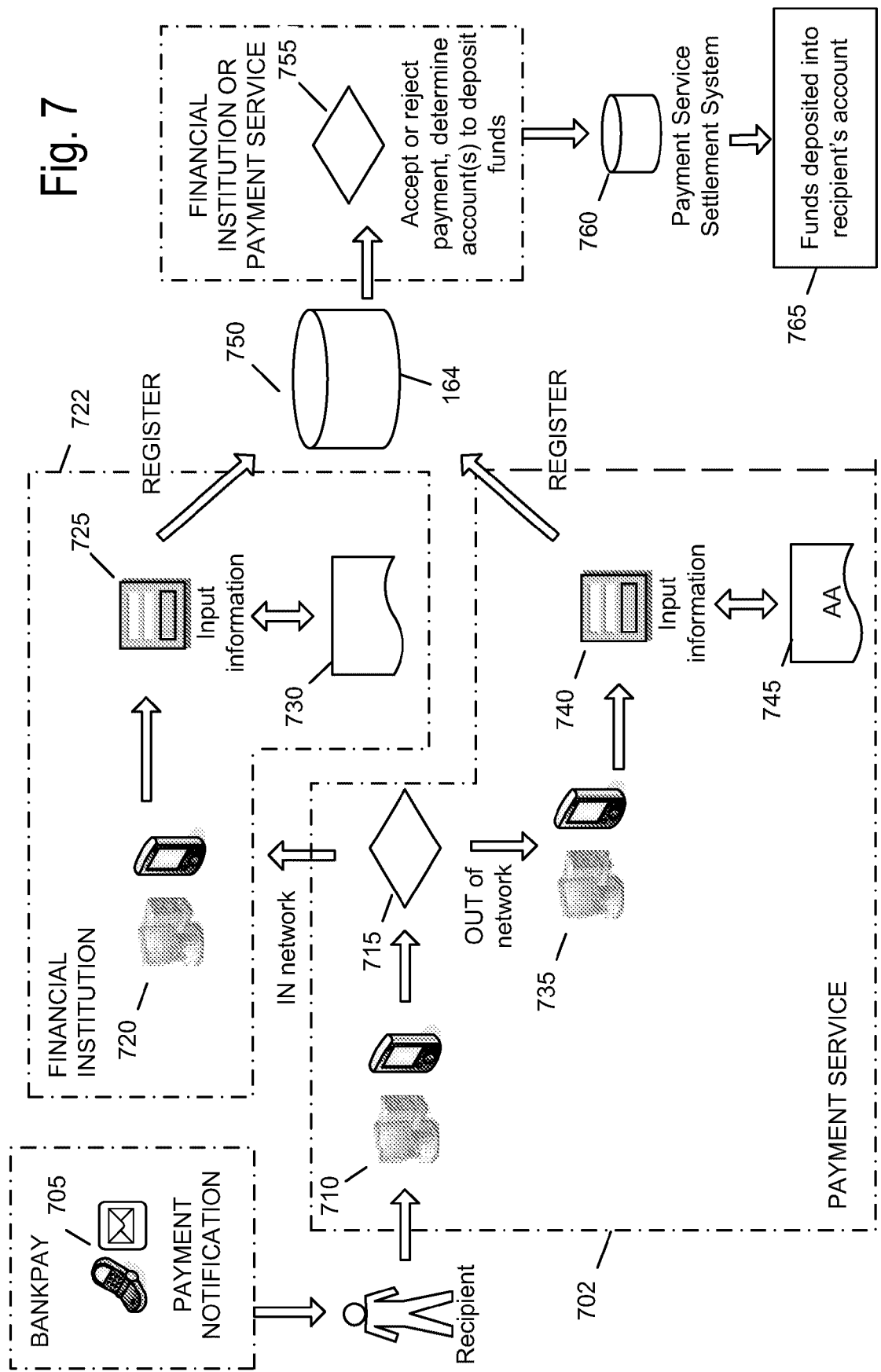
FIG. 7 is a process in which an unregistered user receives a payment according to an example embodiment.

FIG. 7 is a process in which a recipient receives a notification of a payment and proceeds to register with the payment service. In FIG. 7, it is assumed that the recipient has not previously registered with the payment service. At step 705, the recipient receives a payment notification from the payment service computer system 160 stating in part that a payment is awaiting the recipient. At step 710, the recipient accesses a website provided by the payment service computer system 160. At step 715, the recipient is asked to identify the bank that the recipient uses. Depending on the response entered by the recipient 705, the payment service computer system 160 determines whether the bank identified entered by the recipient is "In Network" (i.e., a member bank) or "Out of Network" (i.e., a non-member bank).

If the recipient uses a member bank, then at step 720 the recipient is presented with access to the online banking area of the website of the recipient's bank. Next, at step 725, the recipient is asked for account information and other token/proxy information. After the information is collected, at step 730, the bank computer system 120 may verify eligibility for the payment service, set transactions limits, and so on.

If the recipient uses a non-member bank, then at step 735 the recipient 705 is presented with web access to registration features of the website provided by the payment service computer system 160. At step 740, the payment service computer system 160 prompts the recipient to provide recipient identification information, account information, and so on. If a bilateral relationship is not already established, the recipient is also asked to provide a two party verification key (e.g., answer to a challenge question, password, etc.). As another example, a paycode may be used which is generated by the payment services computer system 160. For example, the e-mail to the recipient may include a code that must be typed in by the recipient when the recipient goes to a website to pick up their payment. The code may also be left as part of an automated telephone message that is left with the recipient. The code may be used to identify the payment that the recipient is attempting to retrieve. At step 745, the payment service computer system 160 confirms that the information provided by the recipient 705 is valid (e.g., using the processes of FIG. 4).

At step 750, the recipient account and verification information is stored in the information directory 164. At step 755, the recipient is given the option to accept or reject the payment. Assuming payment is accepted, the account to which the funds are to be deposited are identified and the funds are deposited to such account. Next, the funds are transferred at step 760 and are deposited into the recipient's account at step 765. For example, a message may be sent to move money from an ODFI settlement account into an RDFI settlement account. Information may be "parsed" and money may be transferred into individual's chosen deposit account. A disbursement confirmation may also be transmitted to the sender computer system 110.

Figure 8:
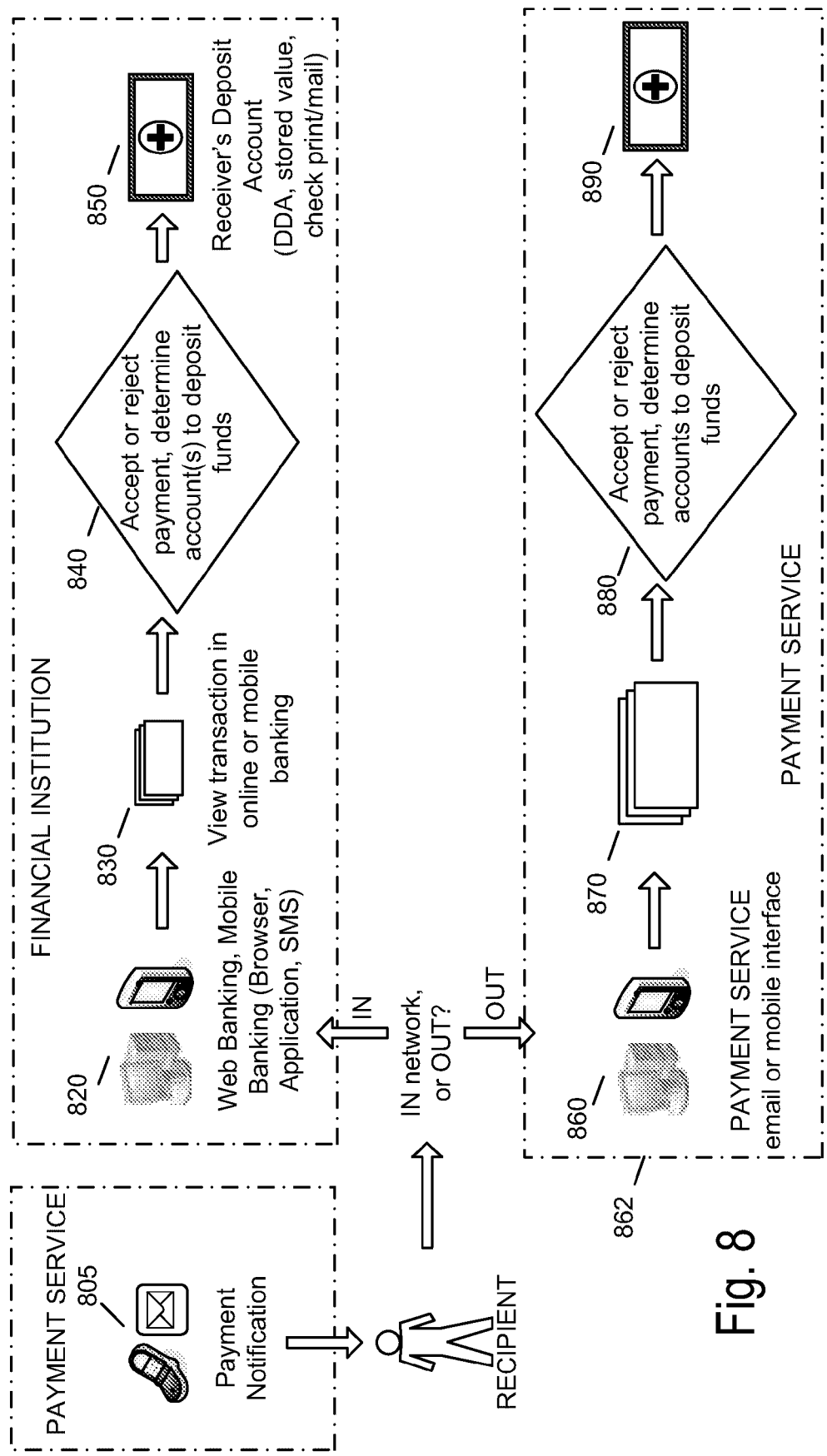
FIG. 8 is a process in which an registered user receives a payment according to an example embodiment.

FIG. 8 is another process in which a recipient receives a notification of a payment. In FIG. 8, it is assumed that the recipient has previously registered with the payment service. At step 805, the recipient receives a payment notification from a payment service computer system 160 that funds are available to be transferred. If the recipient uses a member bank, then at step 820 the recipient accesses the online banking area of the recipient's bank. At step 830, the recipient is allowed to view the transaction online or in a mobile banking area of the website. The transaction view presents the amount, date, sender, remittance information, and so on. At step 840, the recipient is given the opportunity to accept or reject the payment. Assuming the recipient accepts the transaction, at step 850 the funds are transferred to the recipient (e.g., deposited to a demand deposit account, provided in the form of a stored value card, provided in the form of a printed check, and/or transferred in another manner). If the recipient uses a non-member bank, then at step 860 the recipient accesses the website provided by the payment service computer system 160. Steps 870-890 are then performed. Steps 870-890 are similar to steps 830-850 except that they are performed by the payment service computer system 160 instead of the bank computer system 150 of the recipient's bank. In other embodiments, default functionality may be provided that causes funds to be deposited automatically (i.e., without having the user affirmatively accept or reject the transaction).

Figure 9:
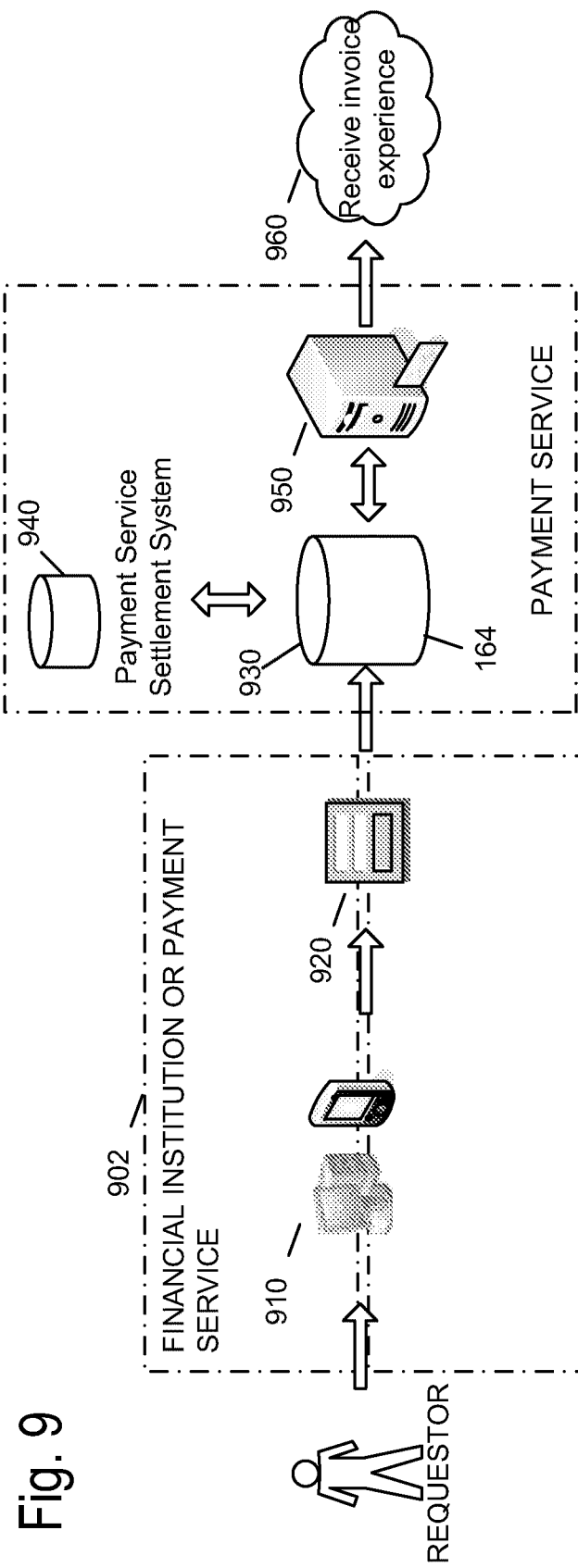
FIG. 9 is a process in which a requestor requests funds from a sender by using a payment service to send an invoice according to an example embodiment.
Figure 10:
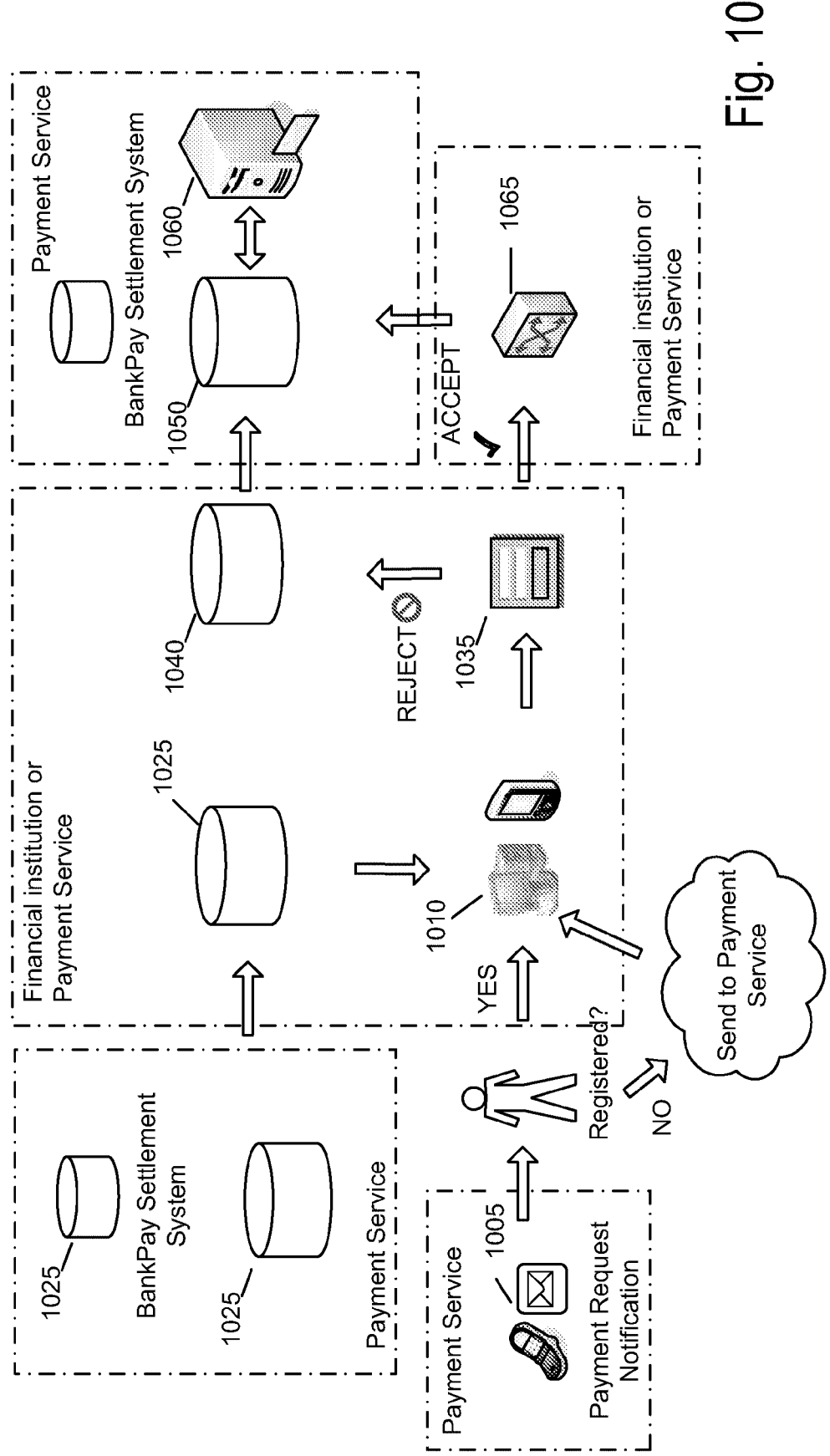
FIG. 10 is a process in which a sender receives the invoice of FIG. 9 and uses the payment service to pay the invoice according to an example embodiment.

Referring now to FIGS. 9-10, FIGS. 9-10 are processes in which a recipient requests payment (e.g., through the sending of an invoice through the payment service computer system 160) and a sender responds by making the requested payment. At step 910, the requestor (eventual recipient) accesses a website provided by the bank computer system 150 or the payment service computer system 160. After entering the website, at step 920, the requestor is prompted to provide information for processing the invoice (identity of the invoice recipient/sender of the payment, amount of the invoice, due date, message, discount, and so on). Next, at step 930, the information provided by the requestor 900 is used by the payment service computer system 160 to identify the invoice recipient/sender of the payment. For example, the information directory 164 may be accessed. At step 940, information regarding the transaction may be logged into the settlement system of the payment service computer system 160. At step 950, an invoice may be sent to the invoice recipient/sender of the payment, for example, via U.S. mail, e-mail, text message (SMS), and so on. At step 960, the invoice recipient/sender of the payment receives the invoice.

FIG. 10 shows the user experience of the invoice recipient/sender of the payment after receiving the invoice. The process of FIG. 10 permits the invoice recipient/sender of the payment to authorize payments electronically using the payment service. At step 1005, the invoice recipient receives the invoice from the payment service. If the invoice recipient is registered with the payment service, then at step 1010 the invoice recipient proceeds to the website provided by the bank computer system 120 or the website provided by the payment service computer system 160, as appropriate. If not, the invoice recipient first registers in the manner previously described. Upon accessing the website, the invoice recipient may be provided with an online view of the invoice information. The invoice information may be populated using information received from the information directory 158, the information directory 164, and/or other databases (step 1025). At step 1035, the invoice recipient is prompted to accept or reject the invoice. If the invoice is rejected, then at step 1040 the rejection is reflected in databases of the bank computer systems 150 and/or the payment service computer system 160. The information directory 164 is accessed at step 1050 and the requestor is sent a notification that the invoice was rejected at step 1060. The computer system 160 may forward the rejection to the fund requestor via e-mail or a text message (SMS). If the recipient accepts the invoice, then at step 1065 the funds are transferred from the account of the invoice recipient to the account of the requestor (payment recipient).

Referring now to FIG. 11, FIG. 11 is a process in which a sender uses the payment service to make a payment to an online merchant. At step 1105, the sender shops at an online shopping site and designates items to be purchased. At step 1110, the sender selects an option at checkout to use the payment service to pay for the items to be purchased, e.g., by selecting a link that is displayed on a checkout web page. At step 1115, it is determined whether the sender is registered. If the sender is registered, then at step 1120 the sender may be redirected to the website provided by the bank computer system 120 where the sender is provided with the ability to view the transaction from within the bank website. Information regarding the transaction may be populated based on information provided from the payment service computer system at step 1125. The sender may accept or reject the transaction at step 1130. At step 1140, if the sender rejects the transaction, then the rejection is sent to the payment services computer system 160. If the sender accepts the transaction, the acceptance is sent to the payment services computer system at step 1150. The rejection or the acceptance, as appropriate, is sent to the merchant computer system at step 1160. A confirmation page is generated at step 1170 and, if the transaction is accepted, the funds are transferred at step 1180.

The embodiments of the present invention have been described with reference to drawings. The drawings illustrate certain details of specific embodiments that implement the systems and methods and programs of the present invention. However, describing the invention with drawings should not be construed as imposing on the invention any limitations that may be present in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the present invention have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present invention may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing computers in the form of computers, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. Input devices, as described herein, include a keyboard, a keypad, a mouse, joystick or other input devices performing a similar function. The output devices, as described herein, include a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present invention as defined in the appended claims. Such variations will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. Other substitutions, modifications, changes and omissions may be made in the design, operating conditions and arrangement of the embodiments without departing from the scope of the present invention as expressed in the appended claims.

What is claimed is:

1. A payment processing method performed by one or more processors of a payment service computer system, the method comprising:
    receiving, by the payment service computer system associated with a payment system, a fund transfer request from a recipient identifying a sender and a fund transfer amount;
    identifying, by the payment service computer system, a first financial institution associated with the sender;
    determining, by the payment service computer system, the first financial institution is a non-member bank;
    in response to determining that the first financial institution is the non-member bank, selecting, by the payment service computer system, an authentication process for the recipient based on a level of risk;
    performing, by the payment service computer system, the authentication process based on the level of risk, the authentication process including:
        prompting, by the payment service computer system, the recipient to provide a first verification key of a two party verification key;
        prompting, by the payment service computer system, the sender to provide information regarding the sender, the information regarding the sender including access credentials for information maintained by the first financial institution, wherein the sender is further prompted to provide a second verification key of the two party verification key;
        verifying, by the payment service computer system, that the first verification key received from the recipient matches the second verification key received from the sender; and
        verifying, by the payment service computer system, accuracy of the information regarding the sender by web scraping the information maintained on a website of the first financial institution using the access credentials, wherein the web scraping comprises sending the information regarding the sender to the website of the first financial institution and determining whether the information constitutes valid credentials based on a response of the website from the sent information regarding the sender; and
    in response to the sender passing the authentication process and approving the fund transfer request, sending, by the payment service computer system, the fund transfer amount from a sender account at the first financial institution to a recipient account associated with the recipient.

2. The method of claim 1, further comprising:
    identifying, by the payment service computer system, the sender based on a recipient interaction with an account information directory, the account information directory comprising a list of registered users of the payment system.

3. The method of claim 1, further comprising:
registering, by the payment service computer system, the recipient with the payment system, the registering including:
prompting, by the payment service computer system, the recipient to provide an identification of a second financial institution that provides an account of the recipient.

4. The method of claim 1, wherein the first financial institution associated with the sender provides the sender account, wherein a second financial institution provides the recipient account, the method further comprising transferring funds from the sender account at the first financial institution to a first settlement account at the first financial institution.

5. The method of claim 4, further comprising transferring the fund transfer amount from the first settlement account at the first financial institution to a second settlement account at the second financial institution.

6. The method of claim 5, further comprising sending, by the payment service computer system, a notice to the recipient that the fund transfer amount is complete.

7. The method of claim 1, wherein the first verification key provided by the recipient is an answer to a challenge question.

8. A non-transitory computer readable storage medium having instructions stored therein that, when executed by at least one processor, cause the at least one processor to perform operations comprising:
receiving a fund transfer request from a recipient identifying a sender and a fund transfer amount;
identifying a first financial institution associated with the sender;
determining the first financial institution is a non-member bank;
in response to determining that the first financial institution is the non-member bank, selecting an authentication process for the recipient based on a level of risk;
performing the authentication process based on the level of risk, the authentication process including:
prompting the recipient to provide a first verification key of a two party verification key;
prompting the sender to provide information regarding the sender, the information regarding the sender including access credentials for the information maintained by the first financial institution, wherein the sender is further prompted to provide a second verification key of the two party verification key;
verifying that the first verification key received from the recipient matches the second verification key received from the sender; and
verifying accuracy of the information regarding the sender by web scraping the information maintained on a website of the first financial institution using the access credentials, wherein the web scraping comprises sending the information regarding the sender to the website of the first financial institution and determining whether the information constitutes valid credentials based on a response of the website from the sent information regarding the sender; and
in response to the sender passing the authentication process and approving the fund transfer request, sending the fund transfer amount from a sender account at the first financial institution to a recipient account associated with the recipient.

9. The non-transitory computer readable storage medium of claim 8, the operations further comprising:
identifying the sender based on a recipient interaction with an account information directory, the account information directory comprising a list of registered users of a payment system.

10. The non-transitory computer readable storage medium of claim 8, the operations further comprising:
registering the recipient with a payment system, the registering including:
prompting the recipient to provide an identification of a second financial institution that provides an account of the recipient.

11. The non-transitory computer readable storage medium of claim 8, wherein the first financial institution associated with the sender provides the sender account, wherein a second financial institution provides the recipient account, the operations further comprising transferring funds from the sender account at the first financial institution to a first settlement account at the first financial institution.

12. The non-transitory computer readable storage medium of claim 11, the operations further comprising transferring the fund transfer amount from the first settlement account at the first financial institution to a second settlement account at the second financial institution.

13. The non-transitory computer readable storage medium of claim 12, the operations further comprising sending a notice to the recipient that the fund transfer amount is complete.

14. The non-transitory computer readable storage medium of claim 8, wherein prompting the sender comprises sending a transmission to a wireless handheld computing device owned by the sender.

15. The non-transitory computer readable storage medium of claim 8, wherein the recipient is a merchant.

16. A system comprising:
a processor;
a non-transitory computer-readable medium storing executable instructions that when executed by the processor causes the processor to perform the steps of:
receive a fund transfer request from a recipient identifying a sender and a fund transfer amount;
identify a first financial institution associated with the sender;
determine the first financial institution is a non-member bank;
in response to determining that the first financial institution is the non-member bank, select an authentication process for the recipient based on a level of risk;
perform the authentication process based on the level of risk, the authentication process including:
prompting the recipient to provide a first verification key of a two party verification key;
prompting the sender to provide information regarding the sender, the information regarding the sender including access credentials for the information maintained by the first financial institution, wherein the sender is further prompted to provide a second verification key of the two party verification key;
verifying that the first verification key received from the recipient matches the second verification key received from the sender; and
verifying accuracy of the information regarding the sender by web scraping the information maintained on a website of the first financial institution using the access credentials, wherein the web scraping comprises sending the information regarding the sender to the website of the first financial institution and determining whether the information constitutes valid credentials based on a response of the website from the sent information regarding the sender; and in response to the sender passing the authentication process and approving the fund transfer request, send the fund transfer amount from a sender account at the first financial institution to a recipient account associated with the recipient.

17. The system of claim 16, wherein the steps further comprise:

identify the sender based on a recipient interaction with an account information directory, the account information directory comprising a list of registered users of a payment system.

* * * * *